United States Patent [19]

Inoue et al.

[11] 4,071,449

[45] Jan. 31, 1978

[54] PROCESS FOR TREATMENT OF WASTE WATER EXHAUSTED FROM WATER-WASH SPRAY BOOTH USING WATER-SOLUBLE PAINT

[75] Inventors: Tuyosi Inoue, Kakogawa; Masao Kimura, Itami; Humikazu Matuda, Kobe, all of Japan

[73] Assignee: Nippon Paint Co., Ltd., Japan

[21] Appl. No.: 787,941

[22] Filed: Apr. 15, 1977

Related U.S. Application Data

[63] Continuation of Ser. No. 658,664, Feb. 17, 1976, abandoned.

[30] Foreign Application Priority Data

Feb. 19, 1975 Japan .................................. 50-21331

[51] Int. Cl.$^2$ .............................................. C02B 1/20
[52] U.S. Cl. ................................... 210/53; 210/54
[58] Field of Search ................ 55/84, 85; 210/39, 40, 210/42 R, 43, 44, 51, 52, 53, 54 A

[56] References Cited

U.S. PATENT DOCUMENTS

| 713,800 | 11/1902 | Reisert | 210/42 |
|---|---|---|---|
| 1,930,885 | 10/1933 | Rittler | 210/53 |
| 2,117,631 | 5/1938 | Seyb | 210/42 |
| 2,470,332 | 5/1949 | Bollaert | 210/53 |
| 2,982,723 | 5/1961 | Arnold et al. | 210/44 |
| 3,497,459 | 2/1970 | Nakamura | 210/52 |
| 3,515,575 | 6/1970 | Arnold | 210/54 A |
| 3,650,686 | 3/1972 | Hudson | 210/42 |
| 3,677,940 | 7/1972 | Fujimoto | 210/44 |
| 3,753,901 | 8/1973 | Taubman | 210/52 |
| 3,798,160 | 3/1974 | Huffman | 210/54 A |
| 3,861,887 | 1/1975 | Forney | 55/85 |
| 3,990,869 | 11/1976 | Forney | 55/85 |

FOREIGN PATENT DOCUMENTS

| 1,205,112 | 9/1970 | United Kingdom | 210/42 |
|---|---|---|---|
| 1,251,761 | 10/1971 | United Kingdom | 210/52 |

*Primary Examiner*—Thomas G. Wyse
*Assistant Examiner*—Ernest G. Therkorn
*Attorney, Agent, or Firm*—Wenderoth, Lind & Ponack

[57] ABSTRACT

A process for treatment of waste water exhausted from a water-wash spray booth using a water-soluble paint which comprises adding an acidic agent and an alkaline agent, which can form a salt insoluble or hardly soluble in water as the result of the interaction between them, to the waste water while keeping its pH value in the range of about 6 to 9 so as to cause the water-soluble paint to be deposited as a non-adhesive coagulation product and eliminating the non-adhesive coagulation product from the resultant waste water by a conventional procedure for separation of solid and liquid.

7 Claims, No Drawings

PROCESS FOR TREATMENT OF WASTE WATER EXHAUSTED FROM WATER-WASH SPRAY BOOTH USING WATER-SOLUBLE PAINT

This is a continuation, of application Ser. No. 658,664, filed Feb. 17, 1976, now abandoned.

The present invention relates to a process for treatment of waste water exhausted from a water-wash spray booth using a water-soluble paint. More particularly, it relates to a process for treatment of the waste water by which the water-soluble paint present in the waste water can be coagulated and eliminated therefrom with easy operation and the resultant waste water can be as such taken out of the system without any trouble or it can be reused as washing water for the water-wash spray booth.

In the field of coating, there have been developed many water-soluble paints which are advantageous in respect of ignitability, toxicity, workability and the like. These water-soluble paints are generally employed in a water-wash spray booth, in which the excess paint as overspray is caught by washing water, which is removed from the system as waste water. When such waste water containing the water-soluble paint is exhausted as such to the outside, environmental pollution problems result. For the purpose of reusing such waste water in the system, clarification treatment is required in order to maintain the desired washing effect. It is thus necessary to isolate and eliminate the water-soluble paint contained in the waste water.

Although water-soluble paints are, in general, relatively stable to amines or ammonia, they become readily unstable and coagulated in the presence of an acid, an alkali or an alkaline earth metal ion, or also by salting out. Therefore, isolation and elimination of a water-soluble paint present in waste water can be attained first by coagulating the paint under such conditions. However, the thus obtained coagulation product is highly adhesive, so that its isolation and eliminating can be effected only with difficulty, and besides, blockage of the circulation system for washing water in the spray booth results. Further, even after such coagulation treatment, the solvent contained in the water-soluble paint remains in the water to afford large BOD- and COD-values, so that further treatment is required in order to exhaust the waste water to the outside. Moreover, when such waste water is reused as washing water in the spray booth, the employed coagulating agent which is readily dissolved in the waste water and remains therein, is gradually accumulated in the washing water to a high concentration, and coagulation of the excess paint overspray finally results, which makes the maintenance of the apparatus troublesome.

As the result of extensive study to overcome such drawbacks, the present inventors have succeeded in obtaining a non-adhesive coagulation product of a water-souble paint present in the said waste water by adding a specific combination of an acidic agent and an alkaline agent while keeping the pH value of the waste water in the range of about 6 to 9 so as to form a salt being insoluble or hardly soluble in water. The resultant waste water, after elimination of the coagulation product, scarcely contains any element which is derived from said acidic and alkaline agents and makes the water-soluble paint unstable.

According to the present invention, there is provided a process for treatment of waste water exhausted from a water-wash spray booth employing a water-soluble paint which comprises adding an acidic agent and an alkaline agent, which can form a salt insoluble or hardly soluble in water as the result of the interaction between them, to the waste water while keeping its pH value in the range of about 6 to 9 so as to make the water-soluble paint deposited as a non-adhesive coagulation product and eliminating the non-adhesive coagulation product from the resultant waste water by a conventional procedure for separation of solid and liquid.

The waste water to be treated is the one exhausted from a water-wash spray booth in which a water-soluble paint is employed. The water-soluble paint may be a per se conventional one such as an air drying type water-soluble paint or a baking type water-soluble paint.

As the acidic agent and the alkaline agent to be used in the invention, there may be employed any one which can form, by their neutralization reaction, a salt which is insoluble or hardly soluble in water (more concretely, a salt whose solubility is 100 ppm or less as cation) and any material which does not make the water-soluble paint unstable (e.g. water). It is thus favorable to use a mineral acid other than hydrochloric acid or its water-soluble salt as the acidic agent and an alkaline earth metal hydroxide or its water-soluble derivative as the alkaline agent. Particularly desirable combinations are phosphoric acid with slaked lime or quick lime and sulfuric acid with barium hydroxide. The combination of phosphoric acid with slaked lime is the most preferable.

The present invention will be hereinafter explained further in detail with reference to the combination of phosphoric acid and slaked lime.

According to the process of the invention, phosphoric acid and slaked lime are added to the waste water at the same time or separately under stirring. It is necessary, in both cases, to keep the pH value of the waste water in the range of about 6 to 9, preferably about 6.6 to 8.5. When the pH value is outside of this range, the water-soluble paint in the waste water can not be coagulated into a product having the desired form. The addition of phosphoric acid and slaked lime is continued until the formation of the coagulation product of the water-soluble paint is finished. It is desired to complete the neutralization reaction at the same time. Since the variation of the pH is small, the coagulation of the water-soluble paint proceeds in small amounts, and the resulting product is adsorbed on the insoluble salt formed by the interaction between phosphoric acid and slaked lime so a to afford a non-adhesive coagulation product. For enhancing the non-adhesiveness of the coagulation product, a conventional adsorptive material such as bentonite, diatomaceous earth or active carbon powder may be preferably added to the coagulation system. It may be also preferable to add to the system a small amount of an organic polymer coagulant so as to make the coagulation product gross. The thus treated waste water is then subjected to a conventional procedure for isolation of solid and liquid. The resultant supernatant shows an extremely low concentration of calcium ion such as, for instance, 20 to 40 ppm. Therefore, this supernatant can be reused as washing water for various water-wash spray booths (in other words, it can be employed to catch the excess water-soluble paint overspay without its immediate coagulation).

By adopting the process of the invention, the problem concerning isolation and elimination of the water-soluble paint present in the waste water, which is the major weak point of conventional processes can be solved. In addition, the waste water subjected to the treatment for isolation and elimination of the water-soluble paint according to the process of the invention can be reused as such as washing water for water spray booths.

Practical and presently preferred embodiments of the invention are illustratively shown in the following examples.

EXAMPLE 1

Waste water: Containing 5 % of a commercially available water-soluble paint ("Odesuper K-20" manufactured by Nippon Paint; epoxy-modified melamine alkyd type resin)
Acidic agent: Phosphoric acid (75 %)
Alkaline agent: Slaked lime To the waste water (1 liter) under stirring, phosphoric acid is added to obtain a pH value of 6.5, then slaked lime is added thereto to make the pH value 8.5, and phosphoric acid is again added to obtain a pH value of 6.5. This addition operation is repeated until phosphoric acid (15 g) and slaked lime (30 g) are consumed, and stirring is continued for 1 hour thereafter. Then 10 ppm of an organic polymer coagulant ("Chemfloc A-10" manufactured by Nippon Paint; polyacrylamide coagulant) is added thereto to make the coagulated product gross under mild stirring. The resultant mixture is subjected to a procedure for isolation of solid and liquid. The thus obtained supernatant shows a calcium ion concentration of 22 ppm. It can be advantageously reused as washing water for a conventional water-wash spray booth without any trouble.

EXAMPLE 2

Waste water: Same as in Example 1
Acidic agent: Sulfuric acid (50 %)
Alkaline agent: Barium hydroxide To the waste water (1 liter) under stirring, sulfuric acid is added to obtain a pH value of 6.5, then barium hydroxide is added thereto to make the pH value 8.5 and sulfuric acid is again added to obtain a pH value of 6.5. This addition operation is repeated until sulfuric acid (18 g) and barium hydroxide (15 g) are consumed, and stirring is continued for 15 minutes thereafter. Then, 10 ppm of the organic polymer coagulant as used in Example 1 is added thereto to make the coagulated product gross under mild stirring. The resultant mixture is subjected to a procedure for isolation of solid and liquid. The thus obtained supernatant shows a barium ion concentration of 2 to 4 ppm. It can be advantageously reused as washing water for a conventional water-wash spray booth without any trouble.

EXAMPLE 3

The same procedure as in Example 1 is repeated. To the resultant supernatant, tap water and the water-soluble paint are added to obtain "waste water" in the same condition as in Example 1, on which the same procedure as in Example 1 is again repeated. This operation is repeated 10 times. On each supernatant, the calcium ion concentration and the solubility of the water-soluble paint are examined, of which results are shown in Table 1. These supernatants can be advantageously reused as washing water.

Table 1

| Number of times | 1 | 2 | 3 | 4 | 5 | 6 | 7 | 8 | 9 | 10 |
| --- | --- | --- | --- | --- | --- | --- | --- | --- | --- | --- |
| Concentration of $Ca^{++}$ | 23 | 23 | 24 | 27 | 24 | 22 | 23 | 26 | 24 | 22 |
| Solubility of paint | Good | Good | Good | Good | Good | Good | Good | Good | Good | Good |

What is claimed is:

1. A process for the treatment of waste water containing a water-soluble paint in uncoagulated form which comprises alternately adding an acidic agent and an alkaline agent to said water to form an insoluble or slightly soluble salt in said water, while keeping said water at a pH value in the range of about 6 to 9, so as to cause the water-soluble paint to be deposited as a nonadhesive coagulation product and eliminating said nonadhesive product from the waste water so treated by liquid-solid separation, said acidic and alkaline agent being added in an amount effective to substantially coagulate said paint.

2. The process according to claim 1, wherein phosphoric acid is used as the acidic agent and slaked lime or quick lime is used as the alkaline agent.

3. The process according to claim 1, wherein the sulfuric acid is uses as the acidic agent and barium hydroxide is used as the alkaline agent.

4. The process according to claim 1, wherein the pH value is kept in the range of about 6.6 to 8.5.

5. The process according to claim 1, wherein bentonite, diatomaceous earth or active carbon powder is present in the system.

6. The process according to claim 1, wherein an organic polymer coagulant is present in the system.

7. The process according to claim 1, wherein the waste water as obtained is used as a washing water in a water-wash spray booth.

* * * * *